United States Patent
Nishida et al.

(10) Patent No.: US 8,116,174 B2
(45) Date of Patent: Feb. 14, 2012

(54) NEAR FIELD LIGHT GENERATING DEVICE, OPTICALLY ASSISTED MAGNETIC RECORDING HEAD, OPTICALLY ASSISTED MAGNETIC RECORDING DEVICE, NEAR FIELD OPTICAL MICROSCOPE AND NEAR FIELD LIGHT EXPOSURE APPARATUS

(75) Inventors: Naoki Nishida, Kusatsu (JP); Kenji Konno, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 253 days.

(21) Appl. No.: 12/524,907

(22) PCT Filed: Jan. 9, 2008

(86) PCT No.: PCT/JP2008/050125
§ 371 (c)(1),
(2), (4) Date: Jul. 29, 2009

(87) PCT Pub. No.: WO2008/099623
PCT Pub. Date: Aug. 21, 2008

(65) Prior Publication Data
US 2010/0118664 A1    May 13, 2010

(30) Foreign Application Priority Data
Feb. 13, 2007    (JP) .................................. 2007-031773

(51) Int. Cl.
*G11B 11/00* (2006.01)

(52) U.S. Cl. .................. 369/13.33; 369/13.13; 360/59

(58) Field of Classification Search ............... 369/13.13, 369/13.33, 13.32, 112.09, 112.14, 112.21, 369/112.27; 360/59; 385/129, 31, 88–94; 250/201.3, 201.5
See application file for complete search history.

(56) References Cited

U.S. PATENT DOCUMENTS

| | | | |
|---|---|---|---|
| 6,795,630 B2 * | 9/2004 | Challener et al. | 369/13.32 |
| 7,330,404 B2 * | 2/2008 | Peng et al. | 369/13.33 |
| 7,359,599 B2 | 4/2008 | Matsumoto | 385/47 |
| 7,529,158 B2 * | 5/2009 | Matsumoto et al. | 369/13.33 |
| 7,791,839 B2 * | 9/2010 | Olson et al. | 360/59 |
| 7,821,732 B2 * | 10/2010 | Komura et al. | 360/59 |
| 7,885,029 B2 * | 2/2011 | Miyauchi et al. | 360/59 |
| 2003/0174301 A1 | 9/2003 | Imanishi | 355/55 |
| 2003/0230709 A1 | 12/2003 | Yamada et al. | 250/234 |
| 2006/0269218 A1 | 11/2006 | Hasegawa et al. | 385/147 |

FOREIGN PATENT DOCUMENTS

| | | |
|---|---|---|
| JP | 2001-326420 A | 11/2001 |
| JP | 2003-114184 A | 4/2003 |
| JP | 2003-255551 A | 9/2003 |
| JP | 2004-20353 A | 1/2004 |
| JP | 2004-28900 A | 1/2004 |
| JP | 2005-116155 A | 4/2005 |
| JP | 2007-280572 A | 10/2007 |
| WO | WO 2005/112014 A1 | 11/2005 |
| WO | WO 2008/099623 A1 | 8/2008 |

* cited by examiner

*Primary Examiner* — Tan X Dinh
(74) *Attorney, Agent, or Firm* — Cozen O'Connor

(57) ABSTRACT

Disclosed is a near field light generating device comprising a first medium layer which transmits light from a light source. This near field light generating device generates near field light by using light irradiating a plasmon probe through the first medium. This near field light generating device is characterized in that a second medium layer having a refractive index lower than that of the first medium layer is formed between the first medium layer and the plasmon probe.

9 Claims, 6 Drawing Sheets

FIG. 4a1 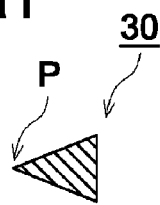
FIG. 4a2 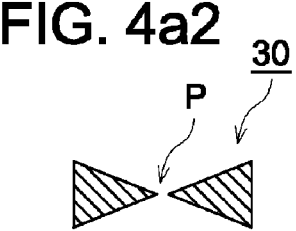
FIG. 4b1 
FIG. 4b2 

NEAR FIELD LIGHT GENERATING DEVICE, OPTICALLY ASSISTED MAGNETIC RECORDING HEAD, OPTICALLY ASSISTED MAGNETIC RECORDING DEVICE, NEAR FIELD OPTICAL MICROSCOPE AND NEAR FIELD LIGHT EXPOSURE APPARATUS

RELATED APPLICATIONS

This application is a U.S. National Phase Application under 35 USC 371 of International Application PCT/JP2008/050125 filed Jan. 9, 2008.

FIELD OF THE INVENTION

The present invention relates to a near field light generating device, an optically assisted magnetic recording head, an optically assisted magnetic recording device, a near field optical microscope and a near field light exposure apparatus.

BACKGROUND OF THE INVENTION

In a magnetic recording method, an increase in the recording density causes the magnetic bit to be seriously susceptible to external temperature and other factors. This requires use of a recording medium having a greater coercive force. However, use of such a recording medium, in turn, increases the magnetic field required for recording. The maximum of the magnetic field generated by the recording head is determined by the saturation magnetic flux density. This value, however, has already come very close to the limit of material, and a drastic increase cannot be expected. A solution to this problem is proposed in a technique wherein magnetic weakening is caused by local heating at the time of recording, and recording is performed when the coercive force is reduced. After that, heating is suspended and natural cooling is performed, whereby the stability of the recorded magnetic bit is ensured. This proposed technique is referred to as a thermally assisted magnetic recording method.

In the thermally assisted magnetic recording method, the recording medium is preferably heated instantaneously. Further, a heating device is not allowed to be in contact with a recording medium. Thus, it is a common practice to use absorption of light for heating. The method of using light for heating is referred to as an optically assisted magnetic recording method. When the optically assisted method is used for extra high-density recording, the required diameter of the spot is about 20 nm. In the normal optical system, condensation of light cannot be performed to meet this requirement, because of the presence of a diffraction limit. Solutions to this problem can be found in the technique having been proposed, wherein the near field light, which is a non-propagation light, is utilized for heating (Patent Document 1). According to this technique, laser beam having an appropriate wavelength is condensed by an optical system, and is applied to a metal (called the plasmon probe) having a size of several tens of nanometers, whereby near field light is generated. This near field light is used for heating.

In another proposed technique (Patent Document 2), the material having a high refractive index is used to manufacture the plasmon probe for generating the near field light and the substrate for forming the plasmon probe (Patent Document 2). In still another proposed technique (Patent Document 3), a plasmon probe is formed in close proximity to the medium having a high refractive index such as silicon, gallium arsenide and germanium.

Patent Document 1: Japanese Unexamined Patent Application Publication No. 2005-116155
Patent Document 2: Japanese Unexamined Patent Application Publication No. 2003-114184
Patent Document 3: Japanese Unexamined Patent Application Publication No. 2004-28900

DISCLOSURE OF INVENTION

Problems to be Solved by the Invention

As disclosed in the Patent Documents 2 and 3, when consideration is given only to condensation of light on the plasmon probe, the material having a high refractive index and a high light condensation efficiency is preferably used to manufacture a condenser element.

The present inventors have found out the fact that the lower the refractive index of the medium of the substrate on which a plasmon probe is formed, the greater the near field light generation efficiency is. This finding signifies that the intensity of the near field light produced can be maximized by considering both the light condensation efficiency and the near field light generation efficiency.

The Patent Documents 2 and 3 introduce the method of increasing the efficiency of condensing light to be applied to the plasmon probe, by using material of a high refractive index as a material of the optical element for the purpose of increasing the intensity of the near field light. However, there is no reference to the efficiency of generating the near field light. Thus, in the configuration disclosed in the Patent Documents 2 and 3, the near field light generation efficiency is low. To get the near field light having a sufficient intensity, a great amount of light must be generated by the near field light generating device. Thus, the near field light generation efficiency is poor according to the methods of the Patent Documents 2 and 3.

In view of the prior art problems described above, it is an object of the present invention to provide a near field light generating device capable of generating the near field light with high efficiency, an optically assisted magnetic recording head, an optically assisted magnetic recording device, a near field light optical microscope and a near field light exposure apparatus.

Means for Solving the Problems

1. A near field light generating device comprising:
a first medium layer through which a light beam coming from a light source transmits;
a plasmon probe which is adapted to generate near field light from the light beam irradiated thereto through the first medium; and
a second medium layer, having a refractive index lower than the first medium layer, which is provided between the first medium layer and the plasmon probe.

2. The near field light generating device of item 1, wherein the first medium layer is a solid immersion lens.

3. The near field light generating device of item 1, wherein the first medium layer is a waveguide.

4. The near field light generating device of any one of items 1 through 3, wherein the first medium layer is composed of silicon, and the second medium layer is composed of $SiO_2$.

5. An optically assisted magnetic recording head, comprising:
the near field light generating device of any one of item 1 through 4; and
a magnetic recording element.

6. An optically assisted magnetic recording device, comprising:
a recording medium;
a drive section adapted to rotate the recording medium;
the optically assisted magnetic recording head of item 5 for irradiating the recording medium with the near field light; and
a head moving section adapted to move the optically assisted magnetic recording head relatively to the recording medium.

7. A near field light microscope, comprising:
the near field light generating device of any one of items 1 though 4 for irradiating a sample with the near field light;
a scanning section for scanning the sample relatively to the near field light generating device; and
a detection section adapted to detect scattered light emitted from the sample.

8. An near field light exposure apparatus, comprising:
the near field light generating device of any one of items 1 through 4 for irradiating a substrate with the near field light; and
an exposure table adapted to hold the substrate provided with a photosensitive material sensitive to the near field light generated by the near field light generating device, at a position to which the near field light reaches.

9. The near field light generating device of item 1, wherein the second medium layer is formed on the first medium layer in a film shape.

10. The near field light generating device of item 9, wherein the second medium layer has a thickness which satisfies the relationship:

$$100 \text{ nm} \leq L \leq 1500 \text{ nm}.$$

11. A near field light generating device, comprising:
a first medium layer through which a light beam from a light source transmits;
a second medium layer which is provided in contact with the first medium layer and has a lower refractive index than the first medium layer; and
a plasmon probe which is provided in contact with the second medium and is adapted to generate near field light with the light beam irradiated through the first medium layer and the second medium layer.

12. The near field light generating device of item 11, wherein the first medium layer is a solid immersion lens.

13. The near field light generating device of item 11, wherein the first medium layer is a waveguide.

14. The near field light generating device of any one of items 11 through 13, wherein the first medium layer is composed of silicon, and the second medium layer is composed of $SiO_2$.

15. An optically assisted magnetic recording head, comprising:
the near field light generating device of any one of item 11 to 14; and
a magnetic recording element.

16. An optically assisted magnetic recording device, comprising:
a recording medium;
a drive section adapted to rotate the recording medium; the optically assisted magnetic recording head of item 15 for irradiating the recording medium with the near field light; and
a head moving section adapted to move the optically assisted magnetic recording head relatively to the recording medium.

17. The near field light generating device of item 11, wherein the second medium layer is formed on the first medium layer in a film shape.

18. The near field light generating device of item 17 wherein the second medium layer has a thickness which satisfies the relationship:

$$100 \text{ nm} \leq L \leq 1500 \text{ nm}.$$

Effects of the Invention

According to the present invention, a second medium layer having a refractive index lower than that of a first medium layer is stacked onto the first medium layer for outputting the condensed light, and a plasmon probe is formed on the second medium layer. This arrangement ensures generation of near field light at high efficiency.

BRIEF DESCRIPTION OF THE DRAWINGS

FIGS. 4a1, 4a2, 4b1, and 4b2 are explanatory diagrams representing a plasmon probe 30 of the present invention.

DESCRIPTION OF THE NUMERALS

Figure 1:
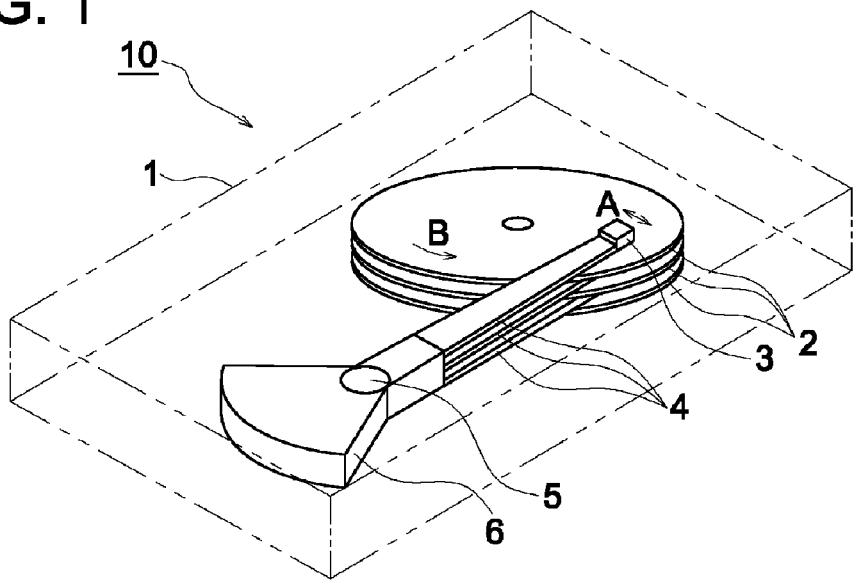
FIG. 1 is a perspective view representing the schematic configuration of an optically assisted magnetic recording device 10.

1 Casing
2 Disk
3 Optically assisted magnetic recording head
4 Suspension
10 Optically assisted magnetic recording device
11 Slider 12 Waveguide
13 Silicon bench
17 Micro prism
30 Plasmon probe
31 Buffer layer
32 Waveguide
39 Near field light generating device
40 Magnetic recording section
41 Magnetic reproduction section
50 SIL
56 Optical fiber
333 Near field light exposure apparatus
999 Near field optical microscope

BEST MODE FOR CARRYING OUT THE INVENTION

Referring to the drawings, the following describes a near field light generating device and an optically assisted magnetic recording head of the present invention, and the optically assisted magnetic recording device equipped therewith. The same or equivalent portions in various embodiments will be assigned with the same reference numerals and will not be described to avoid duplication.

FIG. 1 is a perspective view representing the schematic configuration of a hard disk apparatus as an example of the optically assisted magnetic recording device equipped with an optically assisted magnetic recording head.

The optically assisted magnetic recording device 10 includes a disk 2 (magnetic recording medium) for recording, a suspension 4 mounted rotatably in the direction of arrow A (tracking direction) using a spindle 5 as a fulcrum, and an actuator 6 for tracking mounted on the suspension 4, where these components are incorporated in a casing 1. This casing 1 also includes an optically assisted magnetic recording head 3 mounted on the front end of the suspension 4, and a motor (not illustrated) for driving the disk 2 in the direction of arrow B. The optically assisted magnetic recording head 3 is configured in such a way as to make a relative movement while levitating above the disk 2. In this example, a plurality of disks 2 and optically assisted magnetic recording heads 3 are stacked. For simplification, the following gives a detailed description of one particular head. Other heads have the same structure. The disk 2 refers to the recording medium of the present invention. The motor is a drive device of the present invention, and the actuator 6 is a head traveling device of the present invention.

Figure 2:
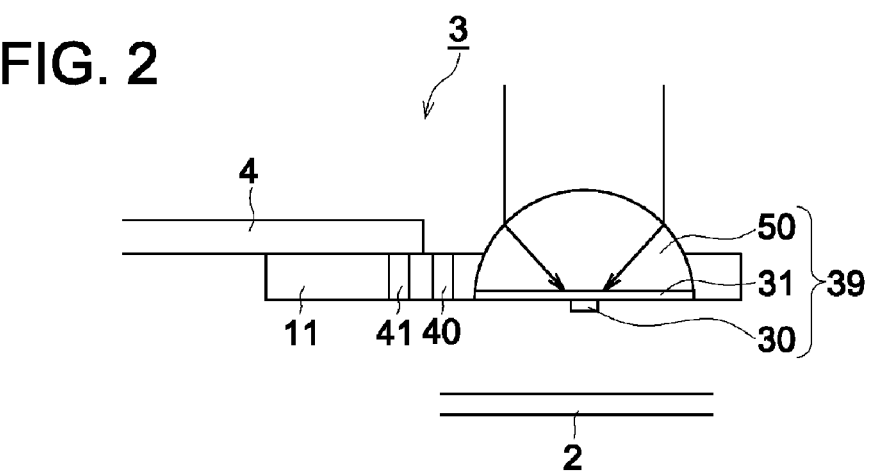
FIG. 2 is a cross sectional view of an optically assisted magnetic recording head 3 and a near field light generating device 39 in a first embodiment of the present invention.

FIG. 2 is a cross sectional view of the optically assisted magnetic recording head 3 and a near field light generating device 39 in the first embodiment of the present invention. FIG. 4 shows an example of the plasmon probe of the present invention.

The optically assisted magnetic recording head 3 of the first embodiment includes a slider 11 provided with the suspension 4, the near field light generating device 39, a magnetic recording section 40 and a magnetic reproduction section 41. The near field light generating device 39 is composed of an SIL (Solid Immersion Lens) 50, a buffer layer 31 and a plasmon probe 30. The SIL 50 corresponds to the first medium layer of the present invention, and the buffer layer 31 corresponds the second medium layer of the present invention.

In the present embodiment, the SIL 50 is made of silicon, and the buffer layer 31 is made of $SiO_2$. This buffer layer 31 can be made by CVD method using TEOS (tetraethoxysilane) as raw material.

The light beam of near-infrared laser beam (having a wavelength of 1550 nm, 1310 nm, etc.) emitted from a semiconductor laser (not illustrated) is condensed by the SIL 50 made of silicon, as indicated by the arrow of FIG. 2.

Figure 3:
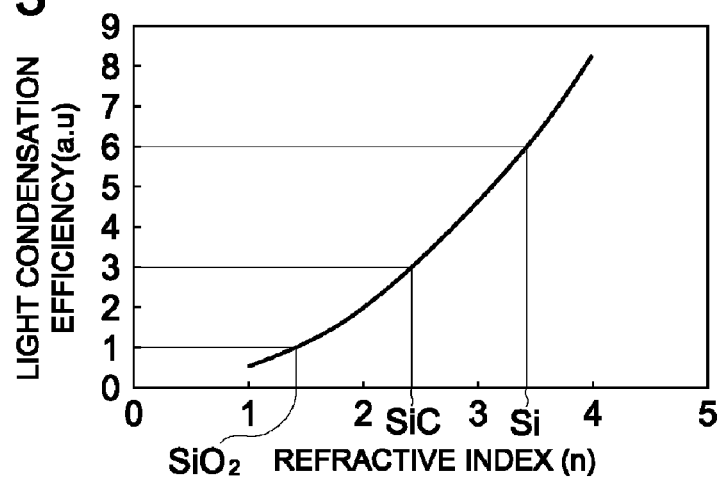
FIG. 3 is a chart showing the relationship between a refractive index "n" of a medium and light condensation efficiency.

Referring to FIG. 3, the following describes the relationship between the refractive index of a medium and light condensation efficiency:

When the laser beams are condensed in an optical system formed of lens or the like, the radius "107" of the spot at the condensed beam waist can be generally expressed by following Formula 1:

$$\omega = \frac{1.22\lambda}{NA} \frac{1}{n} \qquad \text{[Formula 1]}$$

In Formula 1, NA denotes the numerical aperture of an optical system, $\lambda$ indicates the wavelength of the beam, and n represents the refractive index of a medium. Formula 1 signifies that the spot diameter of the condensed beam is increased in proportion to the refractive index of the medium. Since the spot area is proportional to the square of the spot diameter, the light power density (light condensation efficiency) in the beam waist is proportional to the square of the refractive index.

FIG. 3 is a chart showing the relationship between the refractive index "n" of a medium plotted on the horizontal axis, and light condensation efficiency plotted on the vertical axis. Plotted on the chart are silicon (Si), silicon carbide (SiC) and $SiO_2$ as examples of the media. The refractive index with respect to the light having a wavelength $\lambda$ of 1.3 μm is 3.5 in the case of silicon, 2.5 in the case of SiC, and 1.5 in the case of $SiO_2$. As described above, since the light condensation efficiency is proportional to a square of the refractive index, the light condensation efficiency of the silicon and silicon carbide is calculated, assuming that the light condensation efficiency of $SiO_2$ is 1. The vertical axis of FIG. 3 is an arbitrary axis and is represented as (a.u.). As will be apparent from the chart, when silicon is used as the medium of the SIL 50, the light condensation efficiency can be improved about six times compared to the efficiency when $SiO_2$ is used.

Referring to FIG. 4, the following describes the plasmon probe 30: In FIGS. 4a1 and 4b1 depict a triangular plasmon probe 30, and FIGS. 4a2 and 4b2 depict a bow-tie type plasmon probe 30. Both of them are made of a flat plate type metallic thin film of gold. FIGS. 4a1 and 4a2 are plan views, and FIGS. 4b1 and 4b2 are front views. Any one of these probes has an apex P having a radius of 20 nm or less.

When these plasmon probes 30 are exposed to light, plasmon resonance is excited, and near field light is generated close to the apex P, and thereby causing the recording or reproduction to be performed using the light beam with a very small spot size. To put it another way, when the plasmon probe 30 is provided at the light output position of the buffer layer 31 formed on the SIL 50, or in the vicinity thereof, near field light is generated, and thereby further reducing the size of the light spot condensed by the SIL 50. This arrangement provides an advantage in high-density recording.

In an optically assisted magnetic recording device 10 equipped with optically assisted magnetic recording head 3, when near field light is applied to the disk 2 from the plasmon probe 30, there is a temporary rise in temperature at the light-exposed portion of the disk 2, so that the coercive force of the disk 2 is reduced. Then magnetic information is written by the magnetic recording section 40 in the light-exposed portion where the coercive force is reduced. Further, the magnetic information written into the disk 2 is read out by the magnetic reproduction section 41.

The medium of the buffer layer 31 of the present embodiment is $SiO_2$, which has a low refractive index of 1.5 compared to the silicon having a refractive index of 3.5. Highly efficient generation of near field light can be ensured when a plasmon probe is formed on the buffer layer 31 having such a low refractive index.

Figure 5:
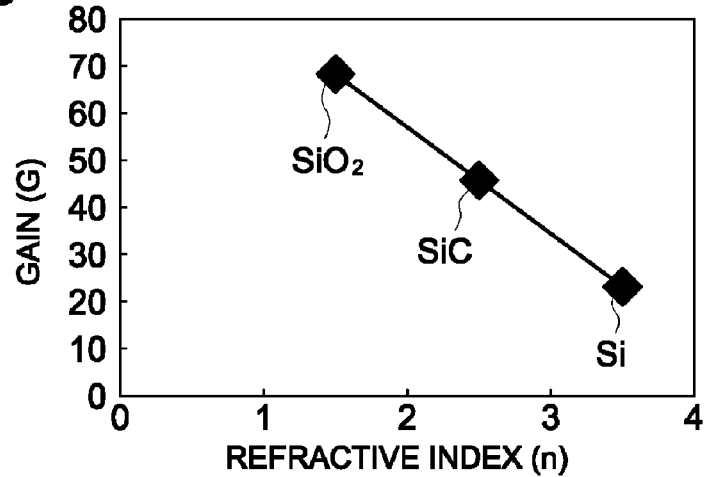
FIG. 5 is the result of simulating the relationship between the gain G of the light intensity and the refractive index "n"
Figure 6:
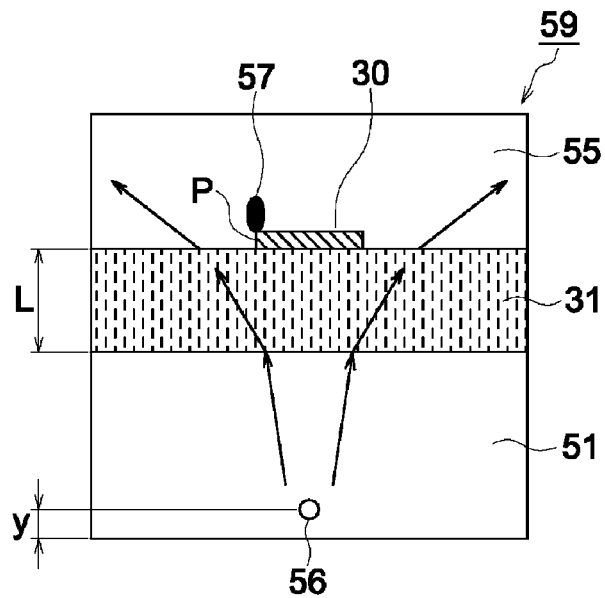
FIG. 6 is a conceptual diagram representing the configuration of a model 59 used in the simulation.

The following describes the relationship between the refractive index n and the gain G of the light intensity (i.e., near field light generation efficiency) with reference to FIGS. 5 and 6. FIG. 5 shows the result of simulating the dependence of the gain G of the light intensity on the refractive index "n", using the FDTD (Finite Difference Time Domain) method. FIG. 6 is a conceptual diagram representing the configuration of the model 59 used in the simulation.

The region used for calculation is a cube having a side of 1500 nm, and a cell size for calculation is 10 nm. FIG. 6 schematically shows the cross section of the cube used for the calculation. In this simulation, a buffer layer 31 having a thickness of L (nm) was stacked on the silicon layer 51, and a gold plasmon probe 30 having a thickness of 40 nm was provided on the buffer layer 31. The plasmon probe used in the simulation was formed in an isosceles triangle, as shown in FIG. 4a1. It has an apical angle of 40 degrees, and the length between the base and apex P of FIGS. 4a1 and 4a2 was 400 nm. The curvature radius of the tip end of the apex P was equal to the minimum cell size of 10 nm used in the calculation. The constants of the gold used in the simulation were a refractive index n of 0.648246423 and k of 10.256716226 with respect to the frequency of light of 200 THz. The space 55 was assumed as being filled with atmospheric air.

The light source 56 was designed in a Gaussian form having a beam waist at a position 350 nm high (y) above the bottom surface of the model 59, where the $1/e^2$ diameter was 800 nm. The frequency of light was 200 THz. The arrows in FIG. 6 indicate the light beam from the light source 56. The light beam applied to the plasmon probe 30 is amplified in the vicinity of the apex P, and near field light 57 is generated, as shown in FIG. 6.

In this simulation, the maximum amplitude E1 of the near field light 57, 10 nm above the plasmon probe 30 (upper side of the sheet), was calculated. In the meantime, the maximum amplitude E0 at the same position when the plasmon probe 30 was not provided on the silicon layer 51 was calculated. Then the gain G of light intensity (i.e., near field light generation efficiency) was calculated from the maximum amplitude E1 and maximum amplitude E0 according to the following Formula 2:

$$G=(E1/E0)^2 \quad \text{(Formula 2)}$$

In this simulation, the gain G was calculated for each of silicon, silicon carbide and $SiO_2$ as media, assuming that the thickness L of the buffer layer 31 was 250 nm. The result of this calculation is given in FIG. 5. As is apparent from FIG. 5, the gain G of light intensity (i.e., near field light generation efficiency) is reduced as the refractive index is increased. For example, when silicon is used as the medium, the gain is about one third of that when $SiO_2$ is used as the medium.

As described above, the gain G is increased when the $SiO_2$ having a refractive index lower than that of silicon is used as the medium of the buffer layer 31 where the plasmon probe 30 is formed. To be more specific, the gain G is greater, namely, the near field light generation efficiency is higher in this case. In the meantime, as shown in FIG. 4, if silicon, which has a refractive index higher than that of the $SiO_2$, is used as the medium of a light condensation element such as an SIL 50, the near field light generation efficiency will be increased. To be more specific, when the silicon with a high refractive index, for example, is used as the medium of the SIL 50, and the surface on the light outgoing side of the SIL 50 is provided with a buffer layer 31 having the medium made of quarts, for example, which has a refractive index lower than that of silicon, then the near field light generation efficiency will be improved.

In this simulation, the plasmon probe 30 is configured in an isosceles triangle as shown in FIGS. 4a1 and 4b1. The same advantages are obtained independently of the shape of the plasmon probe 30. For example, when the plasmon probe 30 is configured in the form of a bow tie as shown in FIGS. 4a2 and 4b2, the same advantages will be also obtained. Alternatively, the same advantages will be also obtained with the pin-shaped plasmon probe 30 (to be described later with reference to FIGS. 10a and 10b).

Figure 7:
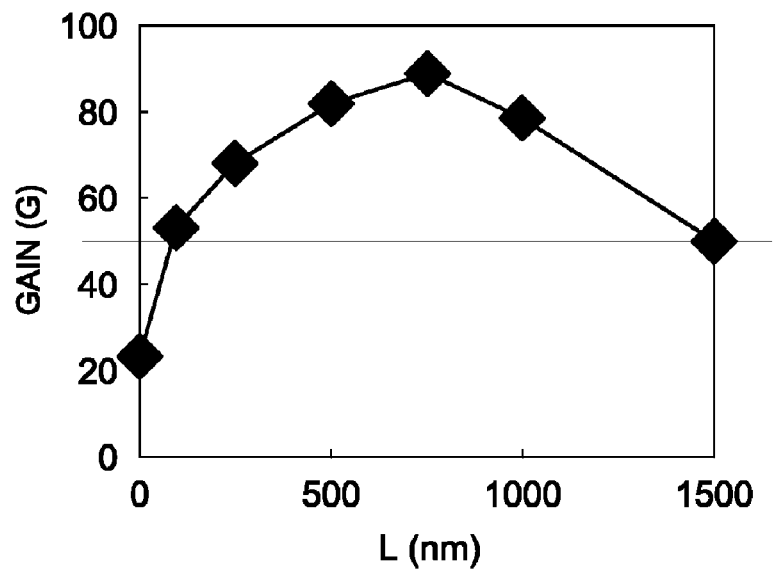
FIG. 7 is a chart showing the relationship between the thickness "L" of a buffer layer 31 using $SiO_2$ as a medium and a gain "G"

Changes in the gain G of light intensity with respect to the thickness L of the $SiO_2$ was studied using the FDTD (Finite Difference Time Domain) method, using $SiO_2$ as the medium of the buffer layer 31 stacked on the silicon layer 51. FIG. 7 shows the result of the calculation. FIG. 7 is a chart showing the relationship between the thickness L of the buffer layer 31 using $SiO_2$ as a medium and the gain G. The case wherein the thickness L of the buffer layer 31 is 0 nm is equivalent to the case where the buffer layer 31 is not stacked on the silicon layer 51.

As is apparent from FIG. 7, when the thickness L of $SiO_2$ is increased, the gain G of light intensity is increased within the range from 0 nm through about 750 nm. However, if the thickness is further increased beyond this range, the gain G is reduced.

Figure 8:
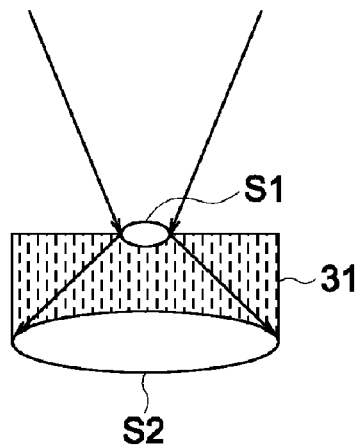
FIG. 8 is an explanatory diagram showing the factors that cause reduction in the gain G.

Referring to FIG. 8, the following describes the factors that cause reduction of the gain G: FIG. 8 shows that the condensed light indicated by the arrow enters the buffer layer 31, and spreads into the buffer layer 31, as indicated by the arrow. To be more specific, the size of the condensed light is reduced to a minute spot of a desired size at the light concentration point S1. As the light goes into the buffer layer of $SiO_2$, it spreads rapidly, and the spot diameter is increased on the surface S2 on the light outgoing side of the light beam.

This adversely affects the advantages of high light condensation efficiency resulting from the condensation of light in the medium having a high refractive index. This will result in a reduction in the overall efficiency when the thickness L of the buffer layer 31 is excessive.

When the near field light generating device 39 is used as the optically assisted magnetic recording head 3, the gain G is preferably twice (where G is about 50 or more) as large as that when L=0 (wherein G is about 25), for practical use. The thickness L of the buffer layer 31 lies preferably within the range of 100 nm≦L≦1600 nm.

This embodiment has been described on the assumption that the medium of the SIL 50 is made of silicon, and the medium of the buffer layer 31 is made of $SiO_2$ without the present invention being restricted thereto. The advantages of the present invention can be obtained if the refractive index of the medium of the buffer layer 31 is lower than that of the medium of the SIL 50.

For the SIL 50, which is the first medium layer of the present invention, a high refractive index material appropriate to the wavelength of the used light may be used. The examples include diamond (for the any visible light range), and the Group III-V semiconductor such as AlGaAs (near-infrared, red), GaN (green, blue), GaAsP (red, orange, blue), GaP (red, yellow, green), InGaN (blue green, blue) and AlGaInP (orange, yellow orange, yellow, green). Further, ZnSe (blue) can be mentioned as a Group II-VI semiconductor. The descriptions in the parenthesis denote the colors of light to be used.

The materials of the buffer layer 31, which is the second medium layer of the present invention, are exemplified by calcium fluoride (CaF), alumina ($Al_2O_3$), silicon nitride ($Si_2N_4$), titanium oxide ($TiO_2$) and diamond (C), in addition to $SiO_2$ and silicon carbide (SiC).

The present embodiment has been described with reference to the example wherein the plasmon probe 30 is made of gold. Without the present invention being restricted thereto, a semiconductor such as Si or GaAs, silver, copper, aluminum and magnesium can be used to produce the plasmon probe 30.

Figure 9:
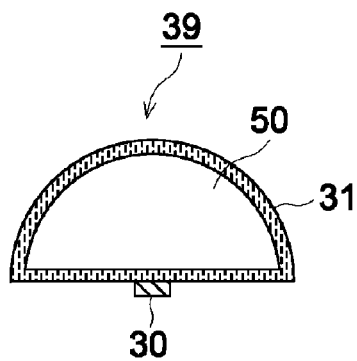
FIG. 9 is a cross sectional view of a near field light generating device 39 in a second embodiment of the present invention.

The near field light generating device 39 in the second embodiment of FIG. 9 is an example where the buffer layer 31 made of silicon is formed on all the surfaces of the SIL 50. Such a buffer layer 31 can be formed on the SIL 50 made of silicon using the steam oxidation method. The near field light generating device 39 in the second embodiment is designed in the same structure as that of the first embodiment, except that the buffer layer 31 made of $SiO_2$ is formed on all the surfaces of the SIL 50. Instead of the near field light generating device 39 of the first embodiment, the near field light generating device 39 can be mounted on the optically assisted magnetic recording head 3. As described above, when the buffer layer 31 made of $SiO_2$ with a low refractive index is formed on all the surfaces of the SIL 50 made of silicon with a high refractive index, the plasmon probe 30 generates near-infrared laser beam with high efficiency in the same way.

The following describes a third embodiment of the near field light generating device 39.

In the following description, the same functional elements as those having been described so far will be assigned with the same reference numerals, and the description will be omitted to avoid duplication.

Figure 10A:
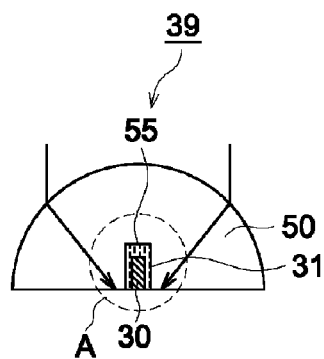
FIGS. 10a and 10b are cross sectional views of a near field light generating device 39 in a third embodiment of the present invention.
Figure 10B:
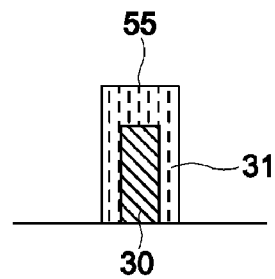

FIGS. 10a and 10b are cross sectional views of a near field light generating device 39 in the third embodiment of the present invention.

FIG. 10a is the cross sectional view of the near field light generating device 39. FIG. 10b is the enlarged view of the portion enclosed by the dotted line A of FIG. 10a. The arrow of FIG. 10a indicates the light beam of the near-infrared laser beam output from a semiconductor laser (not illustrated).

A recessed section 55 is provided, on the SIL 50 made of silicon, using the dry etching method or the like. A $SiO_2$ buffer layer 31 is formed on all the surfaces of the recessed section 55 using the CVD method. Gold is embedded into the buffer layer 31 by resistance heating vapor deposition method or the like, whereby a pin-shaped plasmon probe 30 is formed.

The above-mentioned procedure ensures light to be condensed efficiently on the plasmon probe 30, and allows the size of the light spot to be further reduced. This is advantageous to high-density recording. Further, the $SiO_2$ buffer layer 31 is formed in the recessed section 55 in the silicon SIL 50, and gold is embedded inside the buffer layer 31 to make the plasmon probe 30. This arrangement ensures efficient generation of near field light.

Further, the near field light generating device 39 can constitute an optically assisted magnetic recording head 3 instead of the near field light generating device 39 of the first embodiment described with reference to FIG. 2. Similarly to the case of the first embodiment, various materials can be used to manufacture the SIL 50 and the buffer layer 31.

The following describes the fourth embodiment of the optically assisted magnetic recording head 3.

Figure 11:
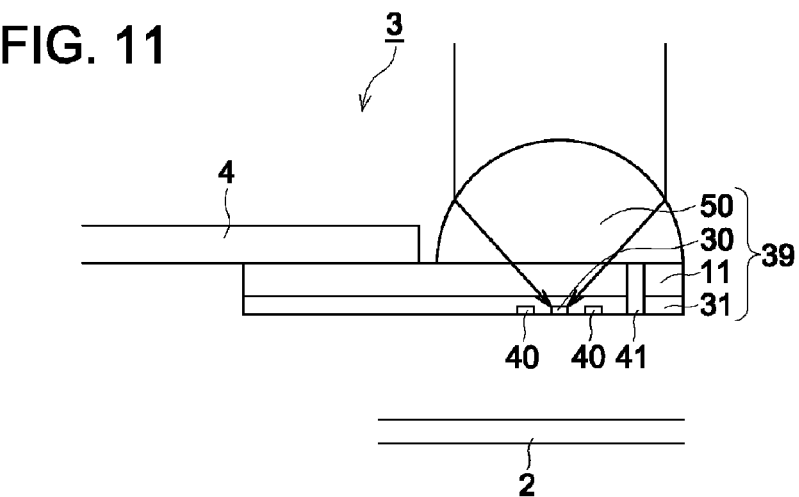
FIG. 11 is a cross sectional view of an optically assisted magnetic recording head 3 and a near field light generating device 39 in a fourth embodiment of the present invention.

FIG. 11 is a cross sectional view of an optically assisted magnetic recording head 3 in the fourth embodiment of the present invention.

In the optically assisted magnetic recording head 3 of the fourth embodiment, a slider 11 is made of silicon. A buffer layer 31 is formed on the side, of the slider 11, opposed to a disk 2. A plasmon probe 30 is embedded and formed on the side, of the buffer layer 31, opposed to the disk 2. The infrared beam output from a semiconductor laser (not illustrated) is condensed by an SIL 50 at the position closed to the apex P (not illustrated) of the plasmon probe 30 formed on the buffer layer 31, as indicated by the arrow of FIG. 11. A near field light generating device 39 of the present embodiment includes the SIL 50, the slider 11, the buffer layer 31 and the plasmon probe 30.

In the present embodiment, the slider 11 is made of silicon. This ensures easy installation of the SIL 50 by adhesion. Thus, highly efficient condensation can be achieved. The slider 11 is the first medium layer of the present invention, and the buffer layer 31 is the second medium layer of the present invention.

The $SiO_2$ buffer layer 31 is formed on the side, of the slider 11, opposed to the disk 2. The gold plasmon probe 30, a magnetic recording section 40 and a magnetic reproduction section 41 are embedded in the buffer layer 31. Further, the side, of the slider 11, opposed to the disk 2 is provided with an air bearing structure (not illustrated) in such a way as to be levitated above the disk 2 by air flow when the disk 2 rotates.

As described above, the buffer layer 31 made of $SiO_2$ with a low refractive index is formed on the side, opposed to the disk 2, of the slider 11 made of silicon with a high refractive index, and a gold-made plasmon probe 30 is formed on the buffer layer 31. This arrangement ensures the near field light of high output to be generated. Further, high-density recording can be performed by the optically assisted magnetic recording device 10 using the optically assisted magnetic recording head 3 carrying such a near field light generating device 39. Similarly to the case of the first embodiment, Various types of the materials can be used to manufacture the slider 11 and buffer layer 31.

Figure 12:
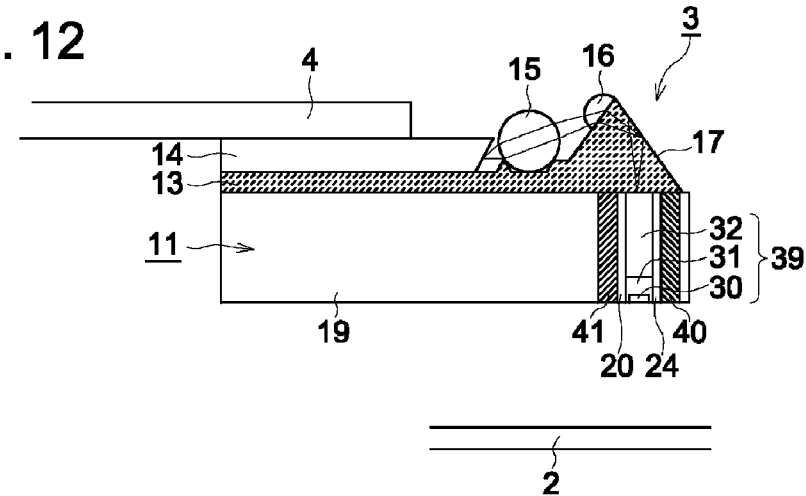
FIG. 12 is a cross sectional view of an optically assisted magnetic recording head 3 and a near field light generating device 39 in a fifth embodiment of the present invention.

FIG. 12 is a cross sectional view of an optically assisted magnetic recording head 3 and a near field light generating device 39 in a fifth embodiment of the present invention.

The optically assisted magnetic recording head 3 of the fifth embodiment includes a silicon bench 13 provided with a suspension 4, an optical fiber 14, a sphere lens 15, a hemispherical lens 16 and a micro prism 17; and the slider 11 equipped with a waveguide 32 and others.

The silicon bench 13 is equipped with the optical fiber 14, the sphere lens 15, the hemispherical lens 16, the silicon micro prism 17 and the suspension 4. The side, of the slider 11, opposed to the disk 2 is provided with an air bearing structure (not illustrated) in such a way as to levitate the slider 11 above the disk 2 by air flow when the disk 2 rotates.

The light beam of the near-infrared laser light (having a wavelength of 1550 nm, 1310 nm, etc.) emitted from a light source (not illustrated) goes out toward the upper right from the optical fiber 14, since the light emitting side end face of the optical fiber 14 is obliquely cut. After that, the light enters the sphere lens 15. The sphere lens 15 is made of, for example, a glass ball (made of BK7, for example) having a diameter of about 0.15 mm, and the light beam is roughly collimated by the sphere lens 15. Having passed through the sphere lens 15, the light beam enters the hemispherical lens 16. The hemispherical lens 16 is made of, for example, a glass hemisphere (made of BK7, for example) having a diameter of about 0.09 mm, and is bonded to the silicon micro prism 17 formed integrally with the light guide section 13. The roughly collimated light beam coming out of the sphere lens 15 is condensed by the sphere lens 15 and is deflected by being totally reflected by the silicon micro prism 17. The silicon micro prism 17 has an apical angle of 70 degrees, and is formed through anisotropic etching. The light beam deflected by the silicon micro prism 17 is condensed onto the waveguide 32 located immediately below, where the silicon of a high refractive index is used as a medium. This completes coupling with the waveguide 32. The waveguide 32 is the first medium layer of the present invention.

The buffer layer 31 made of $SiO_2$ having a low refractive index is arranged on the surface on the side of the disk 2 where a light beam is output from the waveguide 32. Further, the gold plasmon probe 30 is embedded and formed on the surface, of the buffer layer 31, opposed to the disk 2. The near field light generating device 39 of the present embodiment includes the waveguide 32, the buffer layer 31 and the plasmon probe 30. The buffer layer 31 is the second medium layer of the present invention.

When the near field light is applied to the disk 2 from the plasmon probe 30, there is a temporary rise in temperature at the portion of the disk 2 exposed to the near field light, so that the coercive force of the disk 2 is reduced. Then magnetic information is written by the magnetic recording section 40 in the light-exposed portion where the coercive force is reduced. Further, the magnetic information written in the disk 2 is read out by the magnetic reproduction section 41.

As described above, when the silicon waveguide 32 is used, light can be effectively guided into the plasmon probe 30. Further, a buffer layer 31 made of $SiO_2$ with a low refractive index is formed on the surface, opposed to the disk 2, of the silicon waveguide 32 with a high refractive index, and the gold plasmon probe 30 is formed on the surface, of the buffer layer 31, opposed to the disk 2. This arrangement ensures efficient generation of near field light.

Similarly to the case of the first embodiment, various types of materials can be used to manufacture the waveguide 32 and the buffer layer 31.

The following describes an optically assisted magnetic recording head 3 and a near field light generating device 39 in the sixth embodiment.

Figure 13:
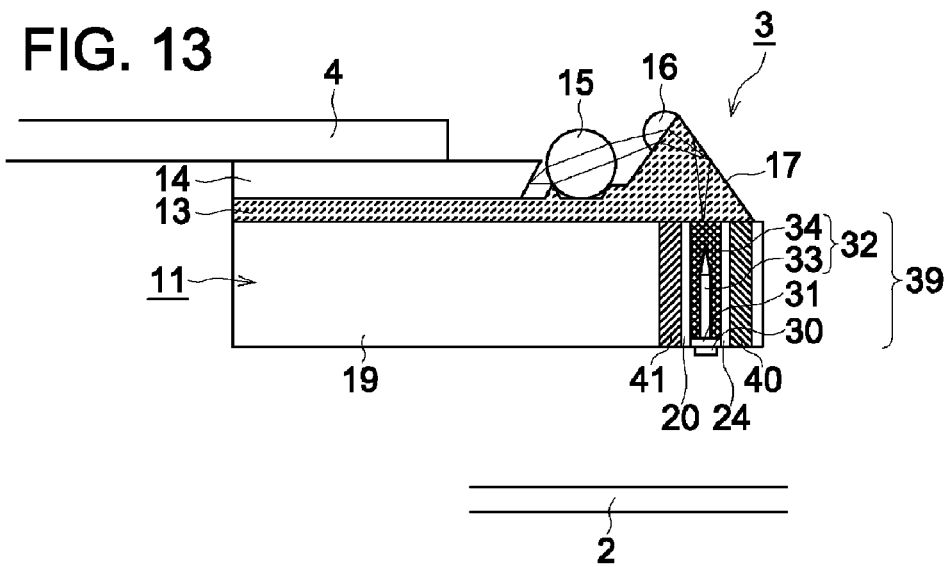
FIG. 13 is a cross sectional view of an optically assisted magnetic recording head 3 in a sixth embodiment of the present invention.

FIG. 13 is a cross sectional view of the optically assisted magnetic recording head 3 in the sixth embodiment of the present invention.

The difference from the fifth embodiment is that the waveguide 32 is composed of a $SiO_2$ clad 34 and a silicon core 33. The core 33 forms a cone where the light entering side is thinner than the other side, and is embedded in the $SiO_2$ clad 34. The core 33 is the first medium layer of the present invention. The near field light generating device 39 of the present embodiment includes the core 33, a buffer layer 31 and a plasmon probe 30. The buffer layer 31 is the second medium layer of the present invention.

This arrangement ensures the spot diameter of the incident light to be gradually reduced from the light entering side to the light outgoing side. The diameter on the light outgoing side is reduced to about one tenth that on the light entering side. When such waveguide 32 is used, the plasmon probe 30 made of $SiO_2$ having a low refractive index is formed on the core 33 made of silicon having a high refractive index, and the plasmon probe 30 is formed on the buffer layer 30, whereby efficient generation of near field light is provided.

Other arrangements are the same as those of the fifth embodiment, and will not be described to avoid duplication.

Figure 14:
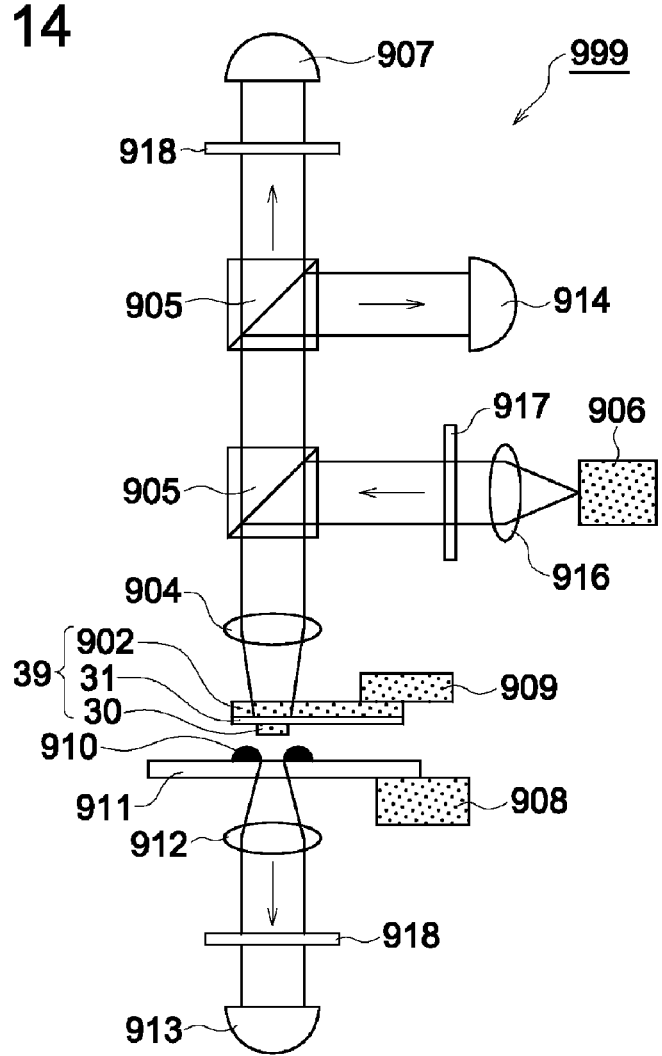
FIG. 14 is a cross sectional view of an embodiment wherein the near field light generating device 39 of the present invention is applied to a near field optical microscope 999.

FIG. 14 is a cross sectional view of an embodiment where the near field light generating device 39 of the present invention is applied to a near field optical microscope 999.

In the illustrated example, a buffer layer 31 made of $SiO_2$ having a low refractive index is formed on the surface on the sample 910's side of the cantilever 902 made of silicon having a high refractive index, and a plasmon probe 30 made of gold is formed on the buffer layer 31. The near field light generating device 39 includes a cantilever 902, the buffer layer 31 and the plasmon probe 30. The cantilever 902 is the first medium of the present invention, and the buffer layer 31 is the second medium layer of the present invention.

The cantilever 902 has a shape like a rectangular thin plate having a length of 50 μm through 500 μm, and a thickness of 0.1 μm through 5 μm. The thickness L of the buffer layer 31 is preferably about 750 nm due to the result of simulation discussed with reference to FIG. 7. It is possible to use the plasmon probe 30 formed in an isosceles triangle as shown in FIG. 4a1 or in a bow tie form as shown in FIG. 4a2.

The sample 910 is placed on a base plate 911, and a plasmon probe 30 is brought closer to the surface thereof. The light coming from a laser 906 is collimated by a lens 916. After passing through a beam splitter 905, the light enters an objective lens 904. The light is condensed by the objective lens and converges at the apex P (not illustrated in FIG. 14) of the plasmon probe 30.

The near field light generated by the plasmon probe 30 is condensed by the objective lens 904. The scattered light emitted from the sample 910 is either detected by the near field light applied, or is condensed by the objective lens 912 placed opposite to the sample 910 and detected by a detector 913.

The scanning piezoelectric element 908 is provided to drive the base plate 911. When the sample 910 is scanned in the horizontal direction by the scanning piezoelectric element 908, changes occur to the intensity of the light emission detected from the sample 910. These changes are recorded to get the image of the sample 910. In this case, if the signal from the sample 910 has a polarizing direction different from that of the incoming light, polarizers 917 and 918 are installed in the optical path. However, when the laser is linearly polarized, only the polarizer 918 may be installed. As described above, the contrast can be improved by setting the polarizing direction of the polarizer 918 at an angle perpendicular to the polarizing direction of the incoming light.

The scanning piezoelectric element 908 is a sample scanning device of the present invention, and the detectors 907 and 913 are the detecting devices of the present invention.

As described above, when the near field light generating device 39 of the present invention is used in a near field optical microscope 999, near field light can be generated at a high efficiency. This provides a sharp image of the sample 910.

The space between the plasmon probe 30 and the surface of the sample 910 should be kept within several tens of nanometers—equivalent to the seepage depth of the near field light. This space can be controlled by measuring the atomic force working between the tip end of the probe and the surface of the sample 910. To be more specific, the plasmon probe 30 is vibrated in the direction of optical axis at an amplitude of less than several nanometers by the vibrating piezoelectric element 909, and the space between the plasmon probe 30 and the surface of the sample 910 is controlled so as to make the amplitude constant. To measure the changes in the amplitude, a beam of light different from the beam output from the laser 906 is applied to the surface, on the objective lens 904 side, of the cantilever 902. The beam of light reflected therefrom is detected by a PSD (Position Sensing Detector) 914, whereby changes in the amplitude are measured. Alternatively, a part of the light, reflected by the cantilever 902, of the beams output from the laser 906 may be detected by the PSD 914 for measuring changes in the amplitude.

Figure 15:
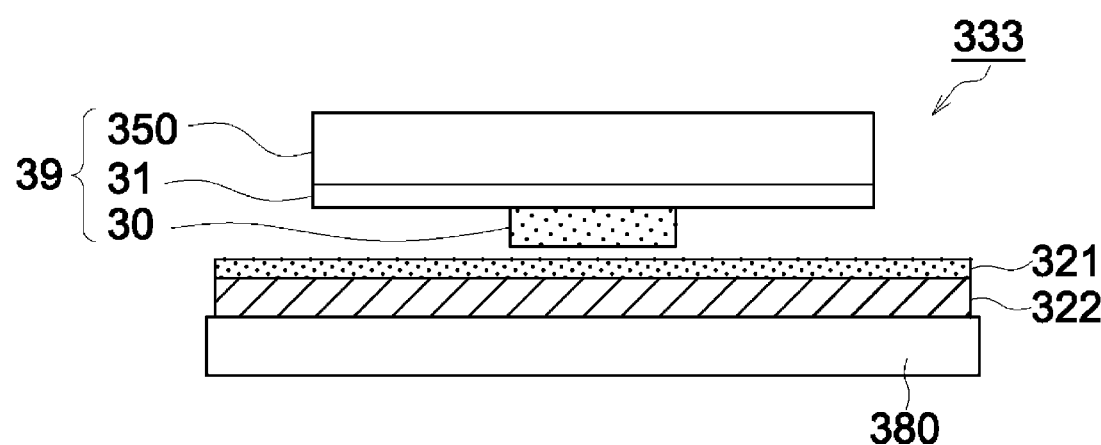
FIG. 15 is a cross sectional view of the embodiment wherein the near field light generating device 39 of the present invention is applied to a near field light exposure apparatus 333.

FIG. 15 is a cross sectional view of an embodiment wherein a near field light generating device 39 of the present invention is applied to a near field light exposure apparatus 333.

The near field light generating device 39 of the present invention can be applied to a near field light exposure apparatus 333 for optical photolithography. FIG. 15 shows an example of its application.

In the illustrated example, a buffer layer 31 using $SiO_2$ as a medium is formed on the surface of the silicon substrate 350 on the side of the substrate 322, and a plasmon probe 30 made of gold is formed on the buffer layer 31. The near field light generating device 39 of the present embodiment includes the substrate 350, buffer layer 31 and plasmon probe 30. The substrate 350 is the first medium layer of the present invention, and the buffer layer 31 is the second medium layer of the present invention.

The substrate 322 to be processed is placed on the exposure table 380 for holding a substrate 322 within the reach of the near field light. The substrate 322 is coated with photo resist 321 that is photosensitive to the near field light generated by the near field light generating device 39. The substrate 322 to be processed is coated with the photo resist 321 that is sensitive to the near field light generated by the near field light generating device 39. The exposure table 380 is the exposure table of the present invention.

The thickness L of the buffer layer 31 is preferably about 750 nm according to the result of simulation discussed with reference to FIG. 7. It is possible to use the plasmon probe 30 formed in an isosceles triangle as shown in FIG. 4a1 or in a bow tie form as shown in FIG. 4a2.

Light by which the photo resist 321 is exposed is made to enter the substrate 350 toward the photo resist 321 from a light source (not illustrated). In this situation, a strong near field light localizing in the vicinity of the apex P of the plasmon probe 30 shown in FIG. 4, and the photo resist in the concerned portion is exposed. After exposure, the photo resist is developed and the substrate 322 is subjected to processing such as etching. The wavelength of the incoming light is preferably determined in a way such that the resist is exposed and the plasmon probe resonance is excited.

As described above, use of the near field light generating device 39 of the present invention causes the photo resist 321 to be exposed by the light of very low power, and also enables a high-speed scanning operation of the near field light generating device 39 on the photo resist 321, with the result that the exposure time can be reduced.

EXAMPLES

The following describes examples to verify the advantages of the present invention, without the present invention being restricted thereto.

Example 1

In Example 1, the SILs 50, with the buffer layers 31 of different thicknesses, used in the near field light generating device 39 in the first embodiment shown in FIG. 2 were made. Further, the optically assisted magnetic recording heads 3 of the first embodiment were made each using the above-obtained near field light generating device 39 to verify that a sufficient amount of near field light for magnetic recording was generated.

The following describes the steps of manufacturing the near field light generating device 39.

First, eight SILs 50 to be used in the near field light generating devices 39 were made of silicon crystal. Each SIL 50 has a curvature radius of 1.4 mm. Then buffer layers 31 each having a thickness of 50, 100, 250, 500, 1000 or 2000 nm were formed on the plane surfaces of the six SILs 50. The buffer layers 31 were formed on the plane surfaces of the SILs 50 using the CVD (chemical vapor deposition) method using the TEOS (tetraethoxysilane) as material.

Gold plasmon probes having a thickness of 40 nm shown in FIG. 41a were formed on the buffer layers 31 of the SILs 50 made in the above-mentioned procedure. As comparative examples, a gold plasmon probe was formed on one of the SILs 50 without a buffer layer 31. An electron beam exposure apparatus was used to pattern. After patterning the resist, a gold film was formed using the resistance heating vapor deposition method, in a triangular shape using the lift-off method.

The near field light generating devices 39 were made each to have the buffer layer 31 with a thickness L of 50, 100, 250, 500 or 1000 nm, and they are referred to as Example 1-1, Example 1-2, Example 1-3, Example 1-4, and Example 1-5, respectively. The near field light generating devices 39 made as comparative examples, where the buffer layers 31 have thicknesses L of 0 and 2000 nm, are referred to as the Comparative example 1-1 and Comparative example 1-2.

[Test Result]

The near-infrared laser beam (having a wavelength of 1550 nm) output from a semiconductor laser was applied to the six near field light generating devices 39 made as Example 1, and the intensity of the generated near field light was checked. Further, for comparison, the near-infrared laser beam (having a wavelength of 1550 nm) emitted from the semiconductor laser was applied to the near field light generating devices 39 of the Comparative example 1-1 and Comparative example 1-2, and to the SIL 50 without a plasmon probe, and the intensity of the generated near field light was checked. Gains G were obtained from the data on the light intensity measured in this manner, assuming the light intensity of the SIL 50 without a plasmon probe as a reference.

Table 1 is a comparative table showing the test results for the Examples 1-1 through 1-6 and Comparative examples 1-1 and 1-2.

TABLE 1

|  | Comp. 1-1 | Example 1-1 | Example 1-2 | Example 1-3 | Example 1-4 | Example 1-5 | Comp. 1-2 |
|---|---|---|---|---|---|---|---|
| Suffix | $x10$ | $x11$ | $x12$ | $x13$ | $x14$ | $x15$ | $x16$ |
| Thickness of buffer layer L (nm) | 0 | 50 | 100 | 250 | 500 | 1000 | 2000 |
| Gain $G_{X1n}$ | 23.3 | 39 | 53.2 | 68.1 | 81.5 | 78.5 | 20.5 |
| Magnification $G_{X1n}/G_{X10}$ | — | 1.7 | 2.28 | 2.92 | 3.5 | 3.37 | 0.9 |

Comp.; Comparative example

In Table 1, suffix "$_{x1n}$" is attached to the gains G of the near field light generating device 39 of the Comparative examples and Examples for the sake of identification. The gain of the Comparative example 1-1 is represented as the gain $G_{X10}$; the gain of the Example 1-1 is represented as the gain $G_{X11}$; and the gain of the Example 1-2 is represented as the gain $G_{X12}$. Similarly, the gain of the Example 1-3 is represented as the gain $G_{X13}$; the gain of the Example 1-4 is represented as the gain $G_{X14}$; the gain of the Example 1-5 is represented as the gain $G_{X15}$; and the gain of the Comparative example 1-2 is represented as the gain $G_{X16}$.

The magnification $G_{X1n}/G_{X10}$ is the ratio of the gain $G_{X1n}$ of Examples or Comparative example 1-2 to the gain $G_{X10}$ of Comparative example 1-1.

As shown in Table 1, the value of the magnification $G_{X1n}/G_{X10}$ is 1.7 for Example 1-1, and is 2 or more for Examples 1-2, 1-3, 1-4 and 1-5. As can be seen, those gains G show that the near field light generating devices 39 of this Example generate near field light more efficiently than the plasmon probe 30 without a buffer layer 31 can be generated.

It has also been verified that the gains G of the near field light generating device 39 of this Example with buffer layers 31 having thicknesses of 100, 250, 500 and 1000 nm are twice or more that of the near field light generating device 39 without a buffer layer 31.

In the meantime, the gain $G_{X16}$ of the Comparative example 1-2 is smaller than the gain $G_{X11}$ of the Comparative example 1-1. It has also been confirmed that the gain G is smaller than the buffer layer 31 having a thickness of over 1000 nm.

Seven optically assisted magnetic recording heads 3 were made each using the above-obtained near field light generating device 39 as the Examples and the Comparative examples, and the heads were then incorporated into an optically assisted magnetic recording device 10 to check if magnetic recording was successfully conducted.

The result of the test has demonstrated that the optically assisted magnetic recording head 3 using the near field light generating device 39 of each Example provides excellent magnetic recording.

Example 2

In Example 2, the SILs 50 were made of GaAsP and the buffer layer 31 was made of GaF with different thicknesses, by the same process as Example 1. Further, the optically assisted magnetic recording heads 3 of the first embodiment were made each using the above-obtained near field light generating device 39 to verify that a sufficient amount of near field light for magnetic recording was generated.

The steps of manufacturing the near field light generating device 39 are the same as Example 1, and detailed description will be omitted.

Similarly to the case of the above-mentioned Example, the buffer layers 31 having thicknesses L of 50, 100, 250, 500, 1000 and 2000 nm were formed on the plane surface of the SILs 50. A gold plasmon probe having a thickness of 40 nm was formed on each buffer layer 31 of the SIL 50 by the same steps as Example 1. As a comparative example, on of the SILs 50 without buffer layers 31, a gold plasmon probe in the same shape was made.

The near field light generating devices 39 where the buffer layers 31 have thicknesses L of 50, 100, 250, 500 and 1000 nm are referred to as Example 2-1, Example 2-2, Example 2-3, Example 2-4, and Example 2-5 in the order of thickness. The near field light generating devices 39 each of which has the buffer layer 31 with a thickness L of 0 and 2000 nm are made for comparison, and they are referred to as the Comparative example 2-1 and Comparative example 2-2.

[Test Result]

The near-infrared laser beam (having a wavelength of 1550 nm) output from a semiconductor laser was applied to the six near field light generating devices 39 made as Example 2, and the intensity of the generated near field light was checked. Further, for comparison, the near-infrared laser beam (having a wavelength of 1550 nm) emitted from the semiconductor laser was applied to the SIL 50 of the near field light generating devices 39 of the Comparative example 2-1 and the Comparative example 2-2, and the intensity of the generated near field light was checked. Gains G were obtained from the data of the light intensity measured in this manner assuming the light intensity of Comparative example 2-2 as a reference.

Table 2 is a comparative table showing the test results for the Comparative example 2-1 and Examples 2-1 through 2-5.

TABLE 2

|  | Comp. 2-1 | Example 2-1 | Example 2-2 | Example 2-3 | Example 2-4 | Example 2-5 | Comp. 2-2 |
|---|---|---|---|---|---|---|---|
| Suffix | x20 | x21 | x22 | x23 | x24 | x25 | x26 |
| Thickness of buffer layer L (nm) | 0 | 50 | 100 | 250 | 500 | 1000 | 2000 |
| Gain $G_{X2n}$ | 14.5 | 20.7 | 32.4 | 44.5 | 55.6 | 49.5 | 13.8 |
| Magnification $G_{X2n}/G_{X20}$ | — | 1.4 | 2.23 | 3.07 | 3.83 | 3.41 | 1.0 |

Comp.; Comparative example

In Table 2, suffixes $_{x2n}$ are attached to the gains G of the near field light generating device 39 in the Comparative examples and Examples, for the sake of identification.

To be more specific, the gain of the Comparative example 2-1 is represented as the gain $G_{X20}$; the gain of the Example 2-1 is represented as the gain $G_{X21}$; and the gain of the Example 2-2 is represented as the gain $G_{X22}$. Similarly, the gain of the Example 2-3 is represented as the gain $G_{X23}$; the gain of the Example 2-4 is represented as the gain $G_{X24}$; the gain of the Example 2-5 is represented as the gain $G_{X25}$; and the gain of the Comparative example 2-2 is represented as the gain $G_{X26}$.

The magnification $G_{X2n}/G_{X20}$ represents the ratio of the gain $G_{X2n}$ of Examples or Comparative example 2-2 to the gain $G_{X20}$ of Comparative example 2-1.

As shown in Table 2, the value of the magnification $G_{X2n}/G_{X20}$ is 1.4 for Example 2-1, and is 2 or more for Examples 2-2, 2-3, 2-4 and 2-5. As can be seen, those gains G show that the near field light generating devices 39 of this Example generate near field light more efficiently than the plasmon probe 30 without a buffer layer 31 formed thereon.

It has also been verified that the gains G of the near field light generating devices 39 of this Example with the buffer layers 31 having thicknesses of 100, 250, 500 and 1000 nm are twice or more that of the near field light generating device 39 without a buffer layer 31 formed thereon.

In the meantime, the gain $G_{X26}$ of the Comparative example 2-2 is smaller than the gain $G_{X21}$ of the Comparative example 2-1. It has also been confirmed that the gain G is reduced if the buffer layer 31 has a thickness of over 1000 nm.

Seven optically assisted magnetic recording heads 3 were made using the near field light generating devices 39 made above as Examples and Comparative examples, and the heads were incorporated into the optically assisted magnetic recording device 10 to check if magnetic recording was successfully conducted.

The result of the test has demonstrated that the optically assisted magnetic recording head 3 having any one of the near field light generating devices 39 of Examples provides excellent magnetic recording.

Example 3

In Example 3, the SILs 50 of FIG. 9 with the buffer layers 31 formed, by the steam oxidation method, each to have different thickness. Further, the optically assisted magnetic recording heads 3 were made each using the above-obtained near field light generating device 39 to verify that a sufficient amount of near field light for magnetic recording was generated.

The following describes the steps of manufacturing the near field light generating device 39.

First, eight SILs 50 to be used in the near field light generating devices 39 were made of silicon crystal. Each SIL 50 has a curvature radius of 1.4 mm. Then buffer layers 31 each having a thickness of 50, 100, 250, 500, 1000 or 2000 nm were formed on the plane surfaces of the six SILs 50. The buffer layers 31 were made by putting the silicon-made SIL 50 in a vapor atmosphere and forming oxide films (SiO$_2$) on the whole surface of each SIL 50.

A Gold film was formed on each buffer layer 31 of six SILs 50 by the resistance heating vapor deposition method, whereby the plasmon probes 30 in an isosceles triangle, shown in FIG. 4a1, having a height of 0.4 μm and an apical angle of 40° was made. For comparison, a plasmon probe 30 of the same configuration was made, by the same method, on the plane surface of the SIL 50 without the buffer layer 31. The near field light generating devices 39 where the buffer layers 31 have the thicknesses L of 50, 100, 250, 500 and 1000 nm are referred to as Example 3-1, Example 3-2, Example 3-3, Example 3-4 and Example 3-5 in the order of thickness. The near field light generating devices 39 made for comparison, where the buffer layers 31 have thicknesses L of 0 and 2000 nm, are referred to as the Comparative example 3-1 and Comparative example 3-2.

[Test Result]

The near-infrared laser beam (having a wavelength of 1550 nm) output from a semiconductor laser was applied to the five near field light generating devices 39 made as Example 3, and the intensity of the generated near field light was checked. Further, for comparison, the near-infrared laser beam (having a wavelength of 1550 nm) emitted from the semiconductor laser was applied to the near field light generating devices 39 of the Comparative example 3-1 and the SIL 50 without the plasmon probe 30 to check the intensity of the generated near field light. Gains G were obtained from the data on the light intensity measured in this manner, assuming the light intensity of the SIL 50 without the plasmon probe 30 as a reference.

Table 3 is a comparative table showing the test results for the Comparative examples 3-1 and 3-2, and Examples 3-1 through 3-5.

TABLE 3

|  | Comp. 3-1 | Example 3-1 | Example 3-2 | Example 3-3 | Example 3-4 | Example 3-5 | Comp. 3-2 |
|---|---|---|---|---|---|---|---|
| Suffix | X30 | X31 | X32 | X33 | X34 | X35 | X36 |
| Thickness of buffer layer L (nm) | 0 | 50 | 100 | 250 | 500 | 1000 | 2000 |
| Gain $G_{X3n}$ | 23.1 | 39.3 | 53.5 | 68.3 | 81.1 | 78.8 | 20.2 |
| Magnification $G_{X3n}/G_{X30}$ | — | 1.7 | 2.32 | 2.96 | 3.51 | 3.41 | 0.9 |

Comp.; Comparative example

In Table 3, similarly to the case of Tables 1 and 2, suffixes $_{X3n}$ are attached to the gains G of the near field light generating device 39 in the Comparative examples and Examples for the sake of identification.

The magnification $G_{X3n}/G_{X30}$ represents the ratio of the gain $G_{X3n}$ of Examples to the gain $G_{X30}$ of Comparative example 3-1.

As shown in Table 3, the value of the magnification $G_{X3n}/G_{X30}$ is 1.7 for Example 3-1, and is 2 or more for Examples 3-2, 3-3, 3-4 and 3-5. As can be seen, the gains G show that the near field light generating devices 39 of this Example generate near field light more efficiently than the plasmon probe 30 without a buffer layer 31.

It has also been verified that the gains G of the near field light generating devices 39 of this Example each having the buffer layers 31 with thicknesses of 100, 250, 500 and 1000 nm are twice or more that of the near field light generating device 39 without a buffer layer 31.

In the meantime, the gain $G_{X36}$ of the Comparative example 3-2 is smaller than the gain $G_{X31}$ of the Comparative example 3-1. It has also been confirmed that the gain G is reduced if the buffer layer 31 is formed to have a thickness of over 1000 nm.

Seven optically assisted magnetic recording heads 3 were made each using the above-obtained near field light generating device 39 as Examples and Comparative examples, and then they were incorporated into the optically assisted magnetic recording device 10 to check if magnetic recording was successfully conducted.

The result of the test has demonstrated that the optically assisted magnetic recording head 3 using the near field light generating device 39 of each Example provides excellent magnetic recording.

Example 4

In Example 4, the near field light generating device 39 of the third Example of FIGS. 10a and 10b were made. The following describes the method of manufacturing the SIL 50 used in the near field light generating device 39 of the third embodiment.

First, a recessed section 55 having a diameter of 2 μm and a depth of 400 nm was made, using the dry etching method, on the plane surface of a silicon hemisphere having a curvature radius of 1.4 mm. Then an SiO$_2$ thin film of the buffer layer 31 was formed, of a TEOS material, on whole the surface of each recessed section 55 of the SILs 50, by the CVD method. Gold was vapor-deposited on the recessed section 55 covered with the buffer layer 31 made of SiO$_2$ by the resistance heating vapor deposition method such that gold was embedded inside the buffer layer 31, whereby a pin-shaped plasmon probe 30 of FIGS. 10*a* and 10*b* was formed.

In this experiment, similarly to the cases of Examples 1 through 3, the SILs 50 were made each having the buffer layer 31 of different thickness, and the near field light generated by these SILs was checked. The near field light generating devices 39 where the buffer layers 31 have the thicknesses L of 50, 100, 250, 500 and 1000 nm are referred to as Example 4-1, Example 4-2, Example 4-3, Example 4-4 and Example 4-5 in the order of thickness. The near field light generating devices 39 made for comparison, where the buffer layers 31 have thicknesses L of 0 and 2000 nm, are referred to as the Comparative example 4-1 and Comparative example 4-2.

Further, the optically assisted magnetic recording heads 3 were made each using the above-obtained near field light generating device 39 to verify that a sufficient amount of near field light for magnetic recording was generated.

[Test Result]

The near-infrared laser beam (having a wavelength of 1550 nm) output from a semiconductor laser was applied to the seven near field light generating devices 39 made as Example 4, and the intensity of the generated near field light was checked. Table 4 is a comparative table showing the test results for the Comparative example 4-1, and Examples 4-1 through 4-6.

TABLE 4

|  | Comp. 4-1 | Example 4-1 | Example 4-2 | Example 4-3 | Example 4-4 | Example 4-5 | Comp. 4-2 |
|---|---|---|---|---|---|---|---|
| Suffix | $x40$ | $x41$ | $x42$ | $x43$ | $x44$ | $x45$ | $x46$ |
| Thickness of buffer layer L (nm) | 0 | 50 | 100 | 250 | 500 | 1000 | 2000 |
| Gain $G_{X4n}$ | 25.8 | 39.5 | 59.7 | 76.2 | 93.4 | 83.3 | 19.8 |
| Magnification $G_{X4n}/G_{X40}$ | — | 1.5 | 2.31 | 2.95 | 3.62 | 3.23 | 0.8 |

Comp.; Comparative example

In Table 4, similarly to the case of Tables 1 through 3, suffixes $_{X4n}$ are attached to the gains G of the near field light generating device 39 for the Comparative examples and Examples for the sake of identification.

The magnification $G_{X4n}/G_{X40}$ represents the ratio of the gain $G_{X4n}$ of Examples to the gain $G_{X40}$ of Comparative example 4-1. The gain $G_{X4n}$ was calculated by the same steps as in above-mentioned Examples.

As shown in Table 4, the value of the magnification $G_{X4n}/G_{X40}$ is 1.5 for Example 4-1, and is 2 or more for Examples 4-2, 4-3, 4-4 and 4-5. As can be seen, the gains G show that the near field light generating device 39 of this Example generates near field light more efficiently than the near field light generating device 39 without buffer layer 31.

It has also been verified that the gains G of the near field light generating device 39 of this Example, where the buffer layers 31 have thicknesses of 100, 250, 500 and 1000 nm are twice or more that of the near field light generating device 39 without a buffer layer 31.

In the meantime, the gain $G_{X46}$ of the Comparative example 4-2 is smaller than the gain $G_{X41}$ of the Comparative example 4-1, and it has thus been confirmed that the gain G is reduced if the buffer layer 31 is formed to have a thickness of over 1000 nm.

Seven optically assisted magnetic recording heads 3 were made using the above-obtained near field light generating devices 39 of Examples and Comparative examples, and they were incorporated into the optically assisted magnetic recording device 10 to check if magnetic recording was successfully conducted.

The result of the test has demonstrated that the optically assisted magnetic recording head 3 having any one of the near field light generating devices 39 of Examples provides excellent magnetic recording.

Example 5

In Example 5, the near field light generating device 39 of the fourth embodiment of FIG. 11 was made. The following describes the method of manufacturing the slider 11 used in the near field light generating device 39 of the fourth embodiment.

First, an SiO$_2$ thin film of the buffer layer 31 was formed on one side of the silicon slider 11 using the TEOS material by the CVD method. This film is the buffer layer 31. Then, a recessed section was made using the dry etching method. Gold was vapor-deposited on the recessed section by the resistance heating vapor deposition method, whereby the plasmon probe 30 was made. An SIL 50 was made of silicon, and was bonded to the slider 11.

Seven near field light generating devices 39 were made each having the buffer layer 31 with different thickness to check the intensity of the generated near field light. The near field light generating devices 39 where the buffer layers 31 have the thicknesses L of 50, 100, 250, 500 and 1000 nm are referred to as Example 5-1, Example 5-2, Example 5-3, Example 5-4 and Example 5-5 in the order of thickness. The near field light generating devices 39 made for comparison, wherein the buffer layers 31 have thicknesses L of 0 and 2000 nm, are referred to as the Comparative example 5-1 and Comparative example 5-2.

Further, the optically assisted magnetic recording heads 3 were made each using the above-obtained near field light generating device 39 to verify that a sufficient amount of near field light for magnetic recording was generated.

[Test Result]

The near-infrared laser beam (having a wavelength of 1550 nm) output from a semiconductor laser was applied to the seven near field light generating devices 39 made as Example 5, and the intensity of the generated near field light was checked. Table 5 is a comparative table showing the test results for the Comparative examples 5-1 and 5-2, and Examples 5-1 through 5-6.

TABLE 5

|  | Comp. 5-1 | Example 5-1 | Example 5-2 | Example 5-3 | Example 5-4 | Example 5-5 | Comp. 5-2 |
|---|---|---|---|---|---|---|---|
| Suffix | $X50$ | $X51$ | $X52$ | $X53$ | $X54$ | $X55$ | $X56$ |
| Thickness of buffer layer L (nm) | 0 | 50 | 100 | 250 | 500 | 1000 | 2000 |
| Gain $G_{X5n}$ | 23.8 | 39.9 | 53.8 | 68.4 | 81.9 | 78.7 | 20.9 |
| Magnification $G_{X5n}/G_{X50}$ | — | 1.7 | 2.26 | 2.87 | 3.44 | 3.31 | 0.9 |

Comp.; Comparative example

In Table 5, similarly to the case of Tables 1 through 3, suffixes $_{X5n}$ are attached to the gains G of the near field light generating device 39 in the Comparative examples and Examples for the sake of identification.

The magnification $G_{X5n}/G_{X50}$ represents the ratio of the gain $G_{X5n}$ of Examples to the gain $G_{X50}$ of Comparative example 5-1.

As shown in Table 5, the value of the magnification $G_{X5n}/G_{X50}$ is 1.7 for Example 5-1, and is 2 or more for Examples 5-2, 5-3, 5-4 and 5-5. As can be seen, the gains G show that the near field light generating device 39 in this Example generates near field light more efficiency than the near field light generating device 39 without a buffer layer 31.

It has also been verified that the gains G of the near field light generating device 39, of this Example, each having the buffer layer 31 with a thickness of 100, 250, 500 or 1000 nm are twice or more that of the near field light generating device 39 without a buffer layer 31.

In the meantime, the gain $G_{X56}$ of the Comparative example 5-2 is smaller than the gain $G_{X51}$ of the Comparative example 5-1. It has also been confirmed that the gain G is reduced if the buffer layer 31 is made to have a thickness of over 1000 nm.

Seven optically assisted magnetic recording heads 3 were made using the near field light generating devices 39, and they were incorporated into the optically assisted magnetic recording device 10 to verify if magnetic recording was successfully conducted.

The result of the test has demonstrated that the optically assisted magnetic recording heads 3 using the near field light generating device 39 each having the buffer layer 31 having thickness of 100, 200, 400 or 1000 nm provides excellent magnetic recording.

Example 6

In Example 6, the near field light generating devices 39 of the fifth embodiment of FIG. 12 were made. The following describes the method of manufacturing the near field light generating device 39 used in the fifth embodiment.

The following describes the method of manufacturing the slider 11 provided with the waveguide 32 of Example 6: After a magnetic reproduction section 41 had been formed on the substrate 19 (made of silicon) of the slider 11, the surface was flattened. Then a film of $SiO_2$ layer 20 was formed with a thickness of 3 μm by the CVD (chemical vapor deposition), and a film of Si layer was then formed with a thickness of 300 nm. A resist was applied thereon, and a resist pattern was formed by electron beam photolithography (alternatively, photolithography using a stepper) so as to get a desired form. Then a reactive ion etching (RIE) method was used to process the Si layer, whereby a waveguide 32 was formed.

After the $SiO_2$ layer 24 with a thickness of 5 μm had been formed by the CVD method, the surface was flattened, and a magnetic recording section 40 was made. As shown in FIG. 12, cutting is conducted to make a shape of the slider by a machining operation such as a dicing and milling operation.

An $SiO_2$ thin film was formed on one end surface of the waveguide 32 on the above-obtained slider 11, using an TEOS material by the CVD method. This film is the buffer layer 31. Gold was vapor-deposited on the buffer layer 31 by the resistance heating vapor deposition method, whereby the plasmon probe 30 in the same shape as the first Example was formed, and the near field light generating device 39 was made. Six near field light generating devices 39 each having the buffer layer 31 of a different thickness as in the above-mentioned Examples were made to check the near field light generated thereby. The near field light generating devices 39 where the buffer layers 31 have the thicknesses L of 50, 100, 250, 500 and 1000 nm are referred to as Example 6-1, Example 6-2, Example 6-3, Example 6-4 and Example 6-5 in the order of thickness. The near field light generating devices 39 made for comparison, where the buffer layers 31 have thicknesses L of 0 and 2000 nm, are referred to as the Comparative example 6-1 and Comparative example 6-2.

Optically assisted magnetic recording heads 3 were made each using the above-obtained slider 11 to verify that a sufficient amount of near field light for magnetic recording was generated.

[Test Result]

The near-infrared laser beam (having a wavelength of 1660 nm) output from a semiconductor laser was applied to the seven near field light generating devices 39 made as Example 6, and the intensity of the generated near field light was checked. Table 6 is a comparative table showing the test results of the Comparative examples 6-1 and 6-2, and Examples 6-1 through 6-6.

TABLE 6

|  | Comp. 6-1 | Example 6-1 | Example 6-2 | Example 6-3 | Example 6-4 | Example 6-5 | Comp. 6-2 |
|---|---|---|---|---|---|---|---|
| Suffix | $X60$ | $X61$ | $X62$ | $X63$ | $X64$ | $X65$ | $X66$ |
| Thickness of buffer layer L (nm) | 0 | 50 | 100 | 250 | 500 | 1000 | 2000 |
| Gain $G_{X6n}$ | 27.2 | 40.5 | 60.2 | 78.5 | 95.2 | 85.3 | 21.4 |

TABLE 6-continued

|  | Comp. 6-1 | Example 6-1 | Example 6-2 | Example 6-3 | Example 6-4 | Example 6-5 | Comp. 6-2 |
|---|---|---|---|---|---|---|---|
| Magnification $G_{X6n}/G_{X60}$ | — | 1.5 | 2.21 | 2.89 | 3.5 | 3.14 | 0.8 |

Comp.; Comparative example

In Table 6, similarly to the case of the above-mentioned Tables, suffixes $_{X6n}$ are attached to the gains G of the near field light generating devices 39 of the Comparative example 6-1 and Examples for the sake of identification.

The magnification $G_{X6n}/G_{X60}$ represents the ratio between the gain $G_{X6n}$ of Examples and the gain $G_{X60}$ of Comparative example 6-1.

As shown in Table 6, the value for magnification $G_{X6n}/G_{X60}$ is 1.5 for Example 6-1, and is 2 or more for Examples 6-2, 6-3, 6-4 and 6-5. As can be seen, the gain G of the near field light generating devices 39 of this Example generate show that near field light more efficiently than the near field light generating device 39 without a buffer layer 31.

It has also been verified that the gains G of the near field light generating devices 39 of this Example each having the buffer layer 31 with a thickness of 100, 250, 500 or 1000 nm are twice or more that of the near field light generating device 39 where the thickness of the buffer layer 31 is zero.

In the meantime, the gain $G_{X66}$ of the Comparative example 6-2 is smaller than the gain $G_{X61}$ of the Comparative example 6-1. It has also been confirmed that the gain G is reduced if the buffer layer 31 is made to have a thickness of over 1000 nm.

Seven optically assisted magnetic recording heads 3 were made using the near field light generating devices 39 for Examples and Comparative examples. They were incorporated into the optically assisted magnetic recording device 10 to check if magnetic recording was successfully conducted.

The result of the test has demonstrated that the optically assisted magnetic recording head 3 having any one of the near field light generating devices 39 of the Example provides excellent magnetic recording.

Example 7

In Example 7, the near field light generating devices 39 of the sixth embodiment of FIG. 13 were made. The following describes the method of manufacturing the near field light generating device 39 used in the sixth embodiment.

The following describes the method of manufacturing the slider 11 provided with the waveguide 32 of Example 7: After a magnetic reproduction section 41 had been formed on the substrate 19 (made of silicon) of the slider 11, the surface was flattened. Then a film of SiO$_2$ layer 20 with a thickness of 3 μm was formed by the CVD (chemical vapor deposition) method, and a film of Si layer with a thickness of 300 nm was then formed. A resist was applied thereon, and a core shape was patterned by electron beam photolithography (alternatively, photolithography using a stepper), so that a resist pattern was formed. In this case, a resist pattern was created to ensure that the core would be formed in a desired tapering shape. Then a reactive ion etching (RIE) method was used to process the Si layer, whereby a core 33 was formed. The CVD method was used to laminate an SiON layer with a thickness of 3 μm. In the photolithography process, the SiNO layer was processed to have a width of 3 μm, whereby a clad 34 was formed. Then the CVD method was used to form a SiO$_2$ layer to have a thickness of 6 μm. Then this was flattened to make a magnetic recording section 40. Cutting was conducted to make a form of slider by machining operation such as a dicing and milling operation.

An SiO$_2$ thin film was formed on one end surface of the waveguide 32 on the above-obtained slider 11, using the TEOS material by the CVD method. This film is the buffer layer 31. Gold was vapor-deposited on the buffer layer 31 by the resistance heating vapor deposition method, whereby the plasmon probe 30 having the same shape as the first Example was formed, and the near field light generating device 39 was made. Seven near field light generating devices 39 each having the buffer layer 31 with a different thickness as in the above-mentioned Examples were made to check the near field light generated thereby. The near field light generating devices 39 wherein the buffer layers 31 have the thicknesses L of 50, 100, 250, 500 and 1000 nm are referred to as Example 7-1, Example 7-2, Example 7-3, Example 7-4 and Example 7-5 in the order of thickness. The near field light generating devices 39 made for comparison, where the buffer layers 31 have thicknesses L of 0 and 2000 nm are referred to as the Comparative example 7-1 and Comparative example 7-2.

Optically assisted magnetic recording heads 3 were made each having the above-obtained slider 11 to verify that a sufficient amount of near field light for magnetic recording was generated.

[Test Result]

The near-infrared laser beam (having a wavelength of 1660 nm) output from a semiconductor laser was applied to the seven near field light generating devices 39 of Example 7, and the intensity of the generated near field light was checked. Table 7 is a comparative table showing the test results for the Comparative examples 7-1 and 7-2, and Examples 7-1 through 7-6.

TABLE 7

|  | Comp. 7-1 | Example 7-1 | Example 7-2 | Example 7-3 | Example 7-4 | Example 7-5 | Comp. 7-2 |
|---|---|---|---|---|---|---|---|
| Suffix | $_{X70}$ | $_{X71}$ | $_{X72}$ | $_{X73}$ | $_{X74}$ | $_{X75}$ | $_{X76}$ |
| Thickness of buffer layer L (nm) | 0 | 50 | 100 | 250 | 500 | 1000 | 2000 |
| Gain $G_{X7n}$ | 27.6 | 41.2 | 61.3 | 78 | 94.8 | 84.2 | 21.2 |

TABLE 7-continued

|  | Comp. 7-1 | Example 7-1 | Example 7-2 | Example 7-3 | Example 7-4 | Example 7-5 | Comp. 7-2 |
|---|---|---|---|---|---|---|---|
| Magnification $G_{X7n}/G_{X70}$ | — | 1.5 | 2.22 | 2.83 | 3.43 | 3.05 | 0.8 |

Comp.; Comparative example

In Table 7, similarly to the case of the above-mentioned Tables, suffixes $_{X7n}$ are attached to the gains G of the near field light generating device 39 of the Comparative examples 7-1 and 7-2, and Examples for the sake of identification.

The magnification $G_{X7n}/G_{X70}$ represents the ratio of the gain $G_{X7n}$ of Examples to the gain $G_{X70}$ of Comparative example 7-1.

As shown in Table 7, the value of the magnification $G_{X7n}/G_{X70}$ is 1.5 for Example 7-1, and is 2 or more for Examples 7-2, 7-3, 7-4 and 7-5. As can be seen, the gains G show that the near field light generating devices 39 in this Example generate near field light more efficiency than the near field light generating device 39 without a buffer layer 31.

It has also been verified that the gains G of the near field light generating devices 39 of this Example each having the buffer layer 31 with a thickness of 100, 250, 500 or 1000 nm are twice or more that of the near field light generating device 39 without a buffer layer 31.

In the meantime, the gain $G_{X76}$ of the Comparative example 7-2 is smaller than the gain $G_{X71}$ of the Comparative example 7-1. It has also been confirmed that the gain G is reduced if the buffer layer 31 is made to have a thickness of over 1000 nm.

Seven optically assisted magnetic recording heads 3 were made using the near field light generating devices 39 having been made as Examples and Comparative examples. They were incorporated into the optically assisted magnetic recording devices 10 to check if magnetic recording was successfully conducted.

The result of the test has demonstrated that the optically assisted magnetic recording head 3 having any one of the near field light generating devices 39 of Examples provides excellent magnetic recording.

As described above, the present invention provides a near field light generating device capable of generating near field light with high efficiency, an optically assisted magnetic recording head, an optically assisted magnetic recording device, a near field optical microscope and a near field light exposure apparatus.

The invention claimed is:

1. A near field light generating device, comprising:
  a waveguide, the waveguide including:
    a clad, and
    a core buried in the clad and having a cone shape which has a smaller diameter on a light entering side of the core than a light outgoing side of the core, so that a spot diameter of a light beam entering the core decreases from the light entering side to the light outgoing side;
  a buffer layer provided in contact with a light outgoing surface of the waveguide and having a lower refractive index than the core; and
  a plasmon probe provided in contact with the buffer layer and receiving the light beam irradiated through the core and the buffer layer to generate near field light.

2. The near field light generating device of claim 1, wherein the core is composed of silicon, and the buffer layer is composed of $SiO_2$.

3. The near field light generating device of claim 2, wherein the clad is composed of $SiO_2$.

4. An optically assisted magnetic recording head, comprising:
  the near field light generating device of claim 1; and
  a magnetic recording element adapted to magnetically record information in a portion of a recording medium, the portion being heated by the near field light generated by the near field light generating device.

5. An optically assisted magnetic recording device, comprising:
  a recording medium;
  a drive section adapted to rotate the recording medium;
  the optically assisted magnetic recording head of claim 4; and
  a head moving section adapted to move the optically assisted magnetic recording head relatively to the recording medium.

6. A near field light microscope, comprising:
  the near field light generating device of claim 1;
  a scanning section for scanning a sample relatively to the near field light generating device; and
  a detection section adapted to detect scattered light emitted from the sample, the scattered light being generated through irradiation of the near field light generated by the near field light generating device.

7. An near field light exposure apparatus, comprising:
  the near field light generating device of claim 1; and
  an exposure table adapted to hold the substrate provided with a photosensitive material sensitive to the near field light, at a position which the near field light reaches.

8. The near field light generating device of claim 1, wherein the buffer layer is formed on the light outgoing surface in a film shape.

9. The near field light generating device of claim 8, wherein the buffer layer has a thickness L which satisfies the relationship:

$$100 \text{ nm} \leq L \leq 1500 \text{ nm}.$$

* * * * *